Dec. 11, 1951     C. O. GLASGOW     2,578,005
PILOT GAS REGULATOR
Filed Nov. 7, 1949
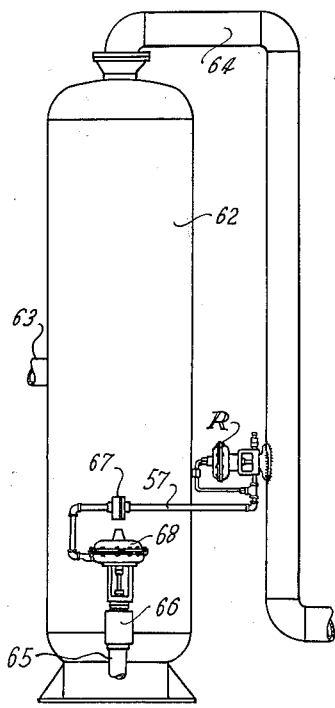
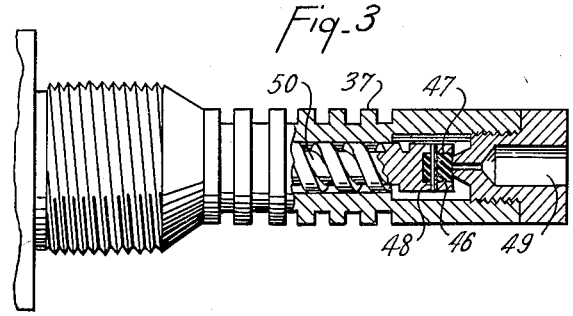
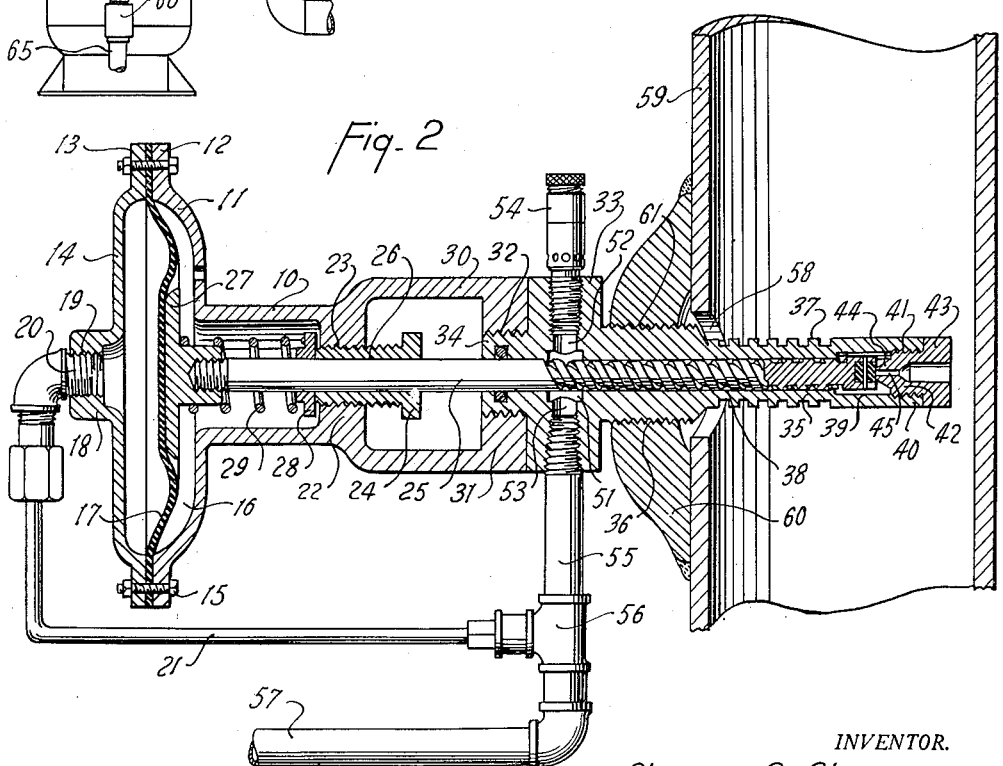
INVENTOR.
Clarence O. Glasgow
BY Ashley & Ashley
ATTORNEYS Patented Dec. 11, 1951

2,578,005

UNITED STATES PATENT OFFICE 2,578,005

PILOT GAS REGULATOR

Clarence O. Glasgow, Tulsa, Okla., assignor to National Tank Company, Tulsa, Okla., a corporation of Nevada Application November 7, 1949, Serial No. 125,883

3 Claims. (Cl. 50—23)

This invention relates to new and useful improvements in pressure regulators and methods for drawing off minor streams of gas from major streams of gas.

There are many instances in which it is necessary or desirable to draw off a small quantity of gas from a main gaseous stream and to reduce the pressure of the drawn-off portion for employment in the carrying out of various purposes. One instance is the drawing off of a small quantity of gas for operating the diaphragm of valves employed on oil and gas separators utilized in the oil fields for the separation of petroleum and gas. The description will largely be directed, for the sake of convenience and illustration, to this particular use of regulators. It is to be kept in mind, however, that the invention is applicable wherever a moderate quantity of gas is drawn off from a main gas stream, and the pressure thereof reduced in the course of such drawing-off.

In reducing the pressure of a diverted stream of gas, the problem of freezing and the formation of hydrates is encountered. Obviously, in reducing the pressure of the drawn-off stream of gas to a considerable degree, an extreme cooling effect is encountered, and the stream of gas is thereby chilled to a point at which freezing and gas hydrate formation occurs. There is nearly always a certain amount of moisture present in the main gas stream, and when a portion thereof is diverted and suddenly cooled to a marked degree, the moisture freezes, nearly always obstructing the regulator and impairing its operation, and sometimes completely blocking or clogging the regulator so as to shut off the supply of gas.

It is therefore a principal object of this invention to provide an improved regulator having provision for the prevention of such freezing or hydrate formation whereby the steady and continuous operation of the regulator is insured.

It is another principal object of this invention to provide an improved method of drawing off a minor stream of gas from a major stream of gas in which the minor stream is warmed following its pressure reduction so as to prevent freezing a hydrate formation.

A particular object of the invention is to provide an improved regulator and a method of gas withdrawal in which the minor stream of gas is passed in heat exchange relationship with the main stream of gas subsequent to the reduction in pressure of said minor stream whereby the minor stream of gas is warmed up to a temperature above that at which freezing or hydrate formation occurs.

A still further object of the invention is to provide an improved regulator having a finned heat exchange element disposed within the main gas stream from which the minor gas stream is to be drawn.

Yet another object of the invention is to provide an improved regulator and a method of gas withdrawal in which the minor stream of gas is passed through an elongate path in heat exchange relationship with a mass of heat-conductive material exposed to or in thermal communication with the main stream of gas, whereby the minor stream is adequately warmed following its pressure reduction.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a side elevation of an oil and gas separator employing a regulator constructed in accordance with this invention, Fig. 2 is an enlarged sectional view of a regulator constructed in accordance with this invention, showing the regulator associated with a pipe or conductor, and Fig. 3 is an enlarged view, partially in elevation and partial in section, of the inlet portion of the regulator.

In the drawings, the numeral 10 designates a tubular regulator body having a dished head 11 at one end. The head 11 carries a marginal outwardly extending flange 12 which receives the complementary flange 13 of a domed head 14. The flanges are joined by suitable bolts 15 to constitute a diaphragm enclosure 16, and a suitable flexible diaphragm 17, of any desirable type, is disposed within the enclosure and has its marginal or peripheral portion clamped between the abutting faces of the flanges 12 and 13. A boss 18 is provided centrally of the domed cover 14, being formed with a screw-threaded bore 19 receiving the screw-threaded end 20 of a suitable conductor 21.

The opposite end of the regulator housing 10 is closed by a transverse partition 22 having a central screw-threaded opening 23 receiving a screw-threaded bushing or valve rod guide 24. A valve rod 25 extends through the axial bore 26 of the guide 24 and carries upon one end a flanged mushroom head 27 which normally engages the underside of the diaphragm 17. A flanged collar 28 is disposed upon the valve rod between the guide 24 and the head 27, and a coiled spring 29 encircles that portion of the valve rod between the collar 28 and the head 27, the spring being confined between said head and said collar and constantly urging the head and the diaphragm 17 toward the domed cover 14. The guide 24 may be adjusted within the opening 23 by rotation therein so as to vary the compressive force exerted by the spring 29 and thus regulate or adjust the spring pressure exerted upon the diaphragm 17 tending to move it toward the domed head 14.

A pair of diametrically opposed legs 30 are formed integrally with the regulator housing 10 and extend from the partition 22 away from the diaphragm enclosure and in spaced parallel relationship with the valve rod 25. A collar 31 is formed integrally with the lower ends of the legs 30, and is provided with a central or axial screw-threaded bore 32 in axial alinement with the opening 26 of the valve rod guide 24. Adjoining the collar 31 is a manifold fitting 33 of generally cylindrical shape and carrying an axial screw-threaded pin 34 which is received within the screw-threaded opening 32 of the collar 31. A resilient O-ring 34' seals between the pin and the collar.

Upon its opposite face, the manifold fitting 33 carries an elongate, axial nozzle or intake fitting 35 which is provided with external screw threads 36 upon its portion adjacent said manifold fitting. Outwardly of the screw-threaded portion, the intake fitting is reduced in external diameter and carries a plurality of circumferential, outwardly extending fins 37 which increase the exposed area of said intake fitting and are employed for heat exchange purposes. An axial bore 38 extends throughout the length of the manifold fitting 33, the pin 34, and the nozzle or intake fitting 35, said axial bore being of such diameter as to receive the valve rod 25 in snug sliding engagement. The bore 38 is enlarged at 39 adjacent the outer extremity 40 of the nozzle or intake fitting and the valve rod 25 extends throughout the length of the bore 38 and approximately half way of the length of the enlarged bore or counterbore 39.

The outer extremity 40 of the intake fitting 35 carries internal screw threads 41, and the screw-threaded pin 42 of a valve seat nipple 43 is received therein. A generally conical teat or projection 44 extends axially of the inner end of the pin 42 into close proximity to the outer end of the valve rod 25. The projection is formed with a reduced axial bore 45, and the inner end of the projection constitutes a valve seat 46 adapted to receive a valve insert 47 recessed in the outer end of the rod 25 and held in position by a transverse pin 48. Obviously, engagement of the insert with the projection will close off the bore 45, while withdrawal of the valve rod and valve insert will open the bore 45 to permit flow therethrough. The outer portion of the bore 45 is enlarged to form an inlet counterbore 49 extending through the outer end of the nipple 43 for the admission of gas to the regulator. For elongating the path of travel of the admitted gas as it passes through this portion of the regulator structure, the valve rod 25 carries an elongate helical groove 50 cut in its outer surface and extending from a point closely adjacent the valve insert 47 within the counterbore 39 to a point spaced medially within the manifold fitting 33. At the latter point, the bore 38 is enlarged to form a chamber 51 surrounding the valve rod and the inner end or terminus of the helical groove 50. A pair of diametrically opposed, radial bores or passageways 52 and 53, respectively, extend outwardly from the chamber 51, the passageway 52 receiving a suitable pressure relief valve 54 which may be of any type desired. Preferably, the pressure relief valve is of the adjustable variety whereby the pressure at which it opens may be adjusted or selected at will.

A suitable pipe or conductor 55 is connected into the opposite passageway 53 and leads to a T-fitting 56 from which a reduced-pressure gas pipe or conductor 57 extends. The pipe or conductor 21 is connected into the other branch of the fitting 56 whereby the pressure of the gas within the conductors 55 and 57 is communicated to the diaphragm housing and exerted upon the outer or left-hand face of the diaphragm 17.

The regulator operates in accordance with well known principles, the spring 29 tending to shift the valve rod 25 to the left to move the insert 47 from the seat 46 and permit the flow of gas, while the gas pressure built up within the conductors 55 and 57 is communicated to the opposite side of the diaphragm 17 and tends to urge the regulator toward a closed position. As is well understood, the force exerted by the spring 29 may be adjusted to cause the regulator to admit gas through the counterbore 49 and to maintain a predetermined pressure within the conductors 55 and 57. Of course, a pressure reduction in the gas stream occurs in the course of this operation, the major portion of the pressure drop occurring within the passage 45 and as the gas stream passes through the valve structure described. This pressure reduction is accompanied by a drop in temperature, in accordance with well known physical principles, and it is at this point that the most difficulty has been encountered through freezing or the formation of hydrates which tend to partially or completely clog the flow passages of the regulator.

Since nearly all of these reduced-pressure streams or flows of gas are drawn off from a larger conductor through which the main gas stream is flowing at a relatively high pressure, a typical installation has been illustrated in Fig. 2 of the drawing. An opening 58 is cut in the wall of the main gas stream conductor 59, and a screw-threaded, flanged fitting 60 welded or otherwise secured in place over said opening. The screw-threaded portion 36 of the inlet fitting 35 is received within the screw-threaded opening 61 of the fitting 60 to provide a pressure-tight arrangement and to position the finned portion of the inlet fitting well within the interior of the pipe 59. In this location, the inlet fitting is exposed to the main stream of gas flowing through the pipe 59, and because of the fins 37, efficient heat exchange is established between said fitting and the main gas stream. Thus, this entire portion of the regulator is held substantially at or near the temperature of the main gas stream, and heat absorbed by the inlet fitting is readily transmitted through an integral metallic path to the screw-threaded portion 36 of the fitting and to the manifold fitting 33. The metallic heat transfer is further enhanced through the wall of the pipe 59, the flanged fitting 60 and the screw-threaded portion 36 of the inlet fitting.

With this method, as the minor or reduced pressure stream of gas passes through the counterbore 49, has its pressure reduced at or near the valve seat 46, and is thereby subjected to a decrease in temperature, the subsequent flow of the minor stream of gas through the helical groove 50 affords ample opportunity for bringing the temperature of said stream up to a desirable temperature since the stream is passed in an elongate path in intimate heat exchange relationship with a considerable mass of metal or other suitable heat-conductive material which is held at temperatures above freezing by its thermal juxtaposition with the main stream of gas. The main gas stream thus is employed to maintain a sizeable portion of the regulator structure at a temperature at which freezing and gas hydrate formation will not occur, and the minor or reduced pressure stream of gas flows in an elongate path in efficient heat exchange relationship with the warmed portion of the regulator, with the net result that freezing and hydrate formation is avoided. It is also to be noted that the flow path of the minor stream of gas is quite circuitous whereby a degree of turbulence is effected and the entire body of said minor stream is subjected to the heating or warming process. Of course, the regulator action of the invention, aside from this heat exchange principle, is the same as that to be found in other types of regulators.

In Fig. 1 is illustrated a particular adaptation of this regulator for use in conjunction with an oil and gas separator as commonly employed in the petroleum industry. The well stream is admitted to a suitable separator tank 62 through an inlet conductor 63, and gas is withdrawn through a pipe 64 leading from the upper end of the tank, while oil is drawn off through a pipe 65 at the lower end of the tank. It is in most cases desirable to control the removal of the oil in accordance with its rate of accumulation, and for this purpose a suitable diaphragm-operated valve 66 may be connected into the outlet conductors 65. A suitable control device 67, which may be of any suitable type, responsive to the height of the body of oil within the tank 62, is connected into the pipe 57 leading from the regulator, here designated by the letter R, to the diaphragm housing 68 of the valve 66. The regulator R is connected into the pipe 66 in substantially the same manner as illustrated in connection with the pipe 59 in Fig. 2. With this arrangement, the heat content of the main stream of gas flowing through the pipe 64 is employed to maintain the temperature of the minor stream of gas withdrawn through the pipe 57 and prevent freezing and clogging of said pipe 57 or any of the passageways of the regulator R. Of course, should such freezing occur, the valve 66 might not be operated, and dangerous or undesirable quantities of oil might accumulate within the tank 62. With the present invention, however, the freezing is prevented, and the operator of the separator structure may rest assured that the oil will be drawn off in the proper fashion as it accumulates.

Of course, the present invention is not limited to any particular type of regulator, the essence of the structure being the providing of the regulator valve with a nozzle or fitting which may be mounted within a flowing stream of gas or within a sizeable body of gas for the purpose of maintaining the withdrawn or minor stream of gas at a safe operating temperature. The utilization of the fins 37 and the elongate helical groove 50 are supplemental and additive features of the invention.

Further, the method involved is not limited to any structure, but encompasses broadly the drawing off of a minor stream of gas, reducing the pressure thereof, and passing it in heat exchange relationship with the main stream of gas. The structure herein described is one means, but not the only means, for carrying out the method. Other arrangements are obvious to one skilled in this art.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In combination with a conductor carrying a main stream of gas under pressure, a pressure reducer for withdrawing a minor stream of gas under reduced pressure including, an inlet fitting connected to and extending a substantial distance into the main stream conductor, said inlet fitting having an inlet within the conductor and an elongate helical flow passage traversing the fitting within the conductor, a pressure-reduction valve between said inlet and said flow passage, means for operating said valve, and a discharge conductor leading from the flow passage exteriorly of the main stream conductor.

2. The combination as set forth in claim 1, and fins on the exterior of the inlet fitting within the main stream conductor.

3. A pilot gas regulator adapted to withdraw a reduced-pressure stream of gas from a main gas stream conductor, including, an elongate inlet fitting having a gas inlet, a valve seat at the inner end of the fitting, a valve rod extending axially of the outer end of the fitting, a valve member carried by the inner end of the rod adapted to engage the valve seat, said fitting and rod having a helical flow passage therebetween leading from the valve seat to the outer portion of the fitting, means for reciprocating the valve rod to seat and unseat the valve member, a discharge conductor leading from the flow passage, and means for securing the inlet fitting in the wall of a gas stream conductor whereby said fitting projects into the latter.

CLARENCE O. GLASGOW.

REFERENCES CITED

The following references are of record in the file of this patent:

UNITED STATES PATENTS

| Number | Name | Date |
|---|---|---|
| 2,011,100 | Woods | Aug. 13, 1935 |
| 2,355,125 | Waterman | Aug. 8, 1944 |
| 2,389,412 | Carlton | Nov. 20, 1945 |
| 2,389,413 | Carlton | Nov. 20, 1945 |
| 2,520,302 | Barnes | Aug. 29, 1950 |